United States Patent Office 3,434,985
Patented Mar. 25, 1969

3,434,985
BAKING VARNISH ON THE BASIS OF ALKYD RESINS AND ETHERIFIED AMINOTRIAZINE RESINS FREE OF FORMALDEHYDE
Wilhelm Becker, Hamburg-Büllstedt, Germany, assignor to Reichhold Chemicals, Inc., White Plains, N.Y.
No Drawing. Continuation-in-part of application Ser. No. 477,320, Aug. 4, 1965. This application Sept. 22, 1965, Ser. No. 489,407
Claims priority, application Germany, Feb. 12, 1965, R 39,888
Int. Cl. C08g 37/32
U.S. Cl. 260—21          18 Claims

ABSTRACT OF THE DISCLOSURE

A baking varnish comprising a blend consisting essentially of (1) an alkyd resin and (2) an etherified aminotriazine resin substantially devoid of free formaldehyde, said varnish when baked having a substantially greater hardness than a comparable blend in which resin (2) has a normal quantity of free formaldehyde, and process of making the same.

---

The present application is a continuation-in-part of my application Ser. No. 477,320, filed Aug. 4, 1965

This invention relates to baking varnishes on the basis of alkyd resins and etherified aminotriazine resins, free of formaldehyde, and to the process of making the same.

Baking varnishes on the basis of alkyd resins and etherified aminotriazine resins have already been in use for some time. The latter need baking temperatures of at least 120° C. for the achievement of sufficiently scratch and thrust resistant films, as can be seen from the German Paten No. 748,829 and various leaflets issued by the producers of synthetic resin varnishes (lacquers) (Reichhold Chemi AG. Cassella, Ciba AG.).

The production of the known etherified aminotriazine resins takes place, generally speaking, in such a manner that, first of all, a condensation product which is relatively low in molecules is produced in a neutral or slightly alkaline, aqueous, aqueous-alcoholic or alcoholic medium from an aminotriazine, sometimes mixed with urea and/or urea derivatives and formaldehyde and/or agents which crack formaldehyde, such as paraform, which subsequently will be further condensed in an acid condensation phase in aqueous alcoholic or alcoholic solution and, at the same time, in going through this process, will be partially etherified or it will be straight away condensed and etherified in a slightly acid aqueous-alcoholic or alcoholic medium. Examples for this method of operation are to be found, for example, in the German Patents 970,453; 1,055,811 and 1,127,083, as well as in J. Scheiber: "Chemistry and Technology of Synthetic Resins," 1943, p. 386–389.

Let us mention by way of example as aminotriazines the 2,4,6-triamino-1,3,5-triazine and diaminotriazine, such as formoguanamine, acetoguanamine and benzoquanamine. As etherification agents, the butanols have been used most; however, other alcohols were also used, such as methanol, ethanol, n- and i-propanol, allyl alcohol as well as amyl alcohols.

In such etherified aminotriazine resins, which are usually on the market in the form of 50 to 70% solutions in organic solvents, a certain portion of the formaldehyde used, which may be up to 10%, will remain uncombined by the aminotriazine, corresponding to the conditions of equilibrium of the law of mass action. These aminotriazine resin solutions have consequently the piercing odor of the free formaldehyde. When using such resin seolutions in baking varnishes, this uncombined formaldehyde will become free in the varnish plants in the course of the evaporation of the solvent part and it will lead to a strong irritation of the breathing organs of the persons working there, apart from the fact that formaldehyde in a higher concentration is an albumin poison. For this reason, aminotriazine resin solutions which only have slight odor are of great interest to the industry.

Furthermore, for economic reasons, baking varnishes with lower baking temperatures of 80 to 90° C. are desirable, which cannot be achieved with the aminotriazine resins known so far, if the baked on films are supposed to be sufficiently hard or if a greater hardness of film is required at baking temperatures above 120° C.

The present invention is concerned with baking varnishes on the basis of alkyd resins in combination with etherified aminotriazine resins free of formaldehyde, which have the great advantage that these new baking varnishes will produce hard, highly brilliant and elastic films already in 30 minutes through heating at 90° C. or that a greater hardness can be achieved at the customary baking temperatures of 120° C. and in that, moreover, the molestation through bad odors of the free formaldehyde will be avoided.

The baking varnishes according to the invention consist of a combination of alkyd resins and etherified aminotriazine resins low in formaldehyde. The etherified aminotriazine resins low in formaldehyde, used according to the invention, can be obtained by condensing butanol and aminotriazine of the general formula:

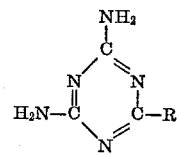

whereby R signifies an $NH_2$ group, an $NH_2$ group substituted through alkyl-, aryl- or acyl radicals, an alkyl-, aryl- or hydroxyl-group singly or in mixture with less than 5 moles, preferably 3.9 to 4.5 moles of formaldehyde and/or formaldehyde supplying substances, in relation to 1 mole of triaminotriazine, through heating while dehydrating through cyclic distillation for such a period of time, until no reaction water is formed any more.

The methyl-, propyl-, i-propyl, butyl- i-butyl- and amyl-groups are involved as alkyl groups, the phenyl group being involved as an aryl group and the acetyl group as an acyl group.

Let us just mention, by way of example, as aminotriazines, the 2,4,6-triamino-1,3,5-triazine and diaminotriazines, such as formoguanamine, acetoguanamine and benzoguanamine. The 2,4,6-triamino-1,3,5-triazine or melamine are preferred as aminotriazine.

The structural isomeric butyl alcohols are suitable as butanols, such as butanol-1, butanol-2, methylpropanol-1, methylpropanol-2, either singly or mixed. The isobutanol in commercial use is preferred. One uses 6 to 10 moles, preferably 8 to 9 moles of isobutanol per mole of aminotriazine.

Paraform can be used as a formaldehyde supplying substance; paraform is used at 3.5 to 5 moles, preferably 3.9 to 4.5 moles (about 95%) per mole of aminotriazine.

One can use as weak acids, acetic acid, formic acid, coconut oil acid, acrylic acid, or else also semi- or partial-esters of multibase acids, for example, a semiester of the maleic acid. Acetic acid in the form of glacial acetic acid is preferred as a weak acid. One uses per mole of aminotriazine preferably 0.5 to 5 ml. preferably 0.8 to 1.5 ml. of glacial acetic acid.

Because of the special simplicity for carrying out of the process, the cyclic distillation at normal pressure is preferred.

After completed condensation, the reaction solution is neutralized with a caustic soda solution and is concentrated at 100 to 110° C. to a solid resin content of 65 to 75% by weight through heating, perhaps under a slight vacuum, in order not to surpass this temperature range, with a switched on descending (decreasing) cooler. Within this range of concentration, an additional 150 to 250 g. are distilled, preferably 200 g. distillate, in relation to 1 mole of melamine without a cycle, while at the same time the same quantity of isobutanol, free of water, will flow in accordance with the distillation to the mixture. In this manner, the remaining condensation water and traces of formaldehyde are removed. One thins down the mixture to the service concentration and filters.

The process will be explained in more detail in the following examples:

MELAMINE RESIN A 800 g. of isobutanol, 102 g. of paraform (97% by weight), 114 g. of aqueous formaldehyde (44% by weight) and 1 ml. of glacial acetic acid are heated together while stirring to 70° C. 160 g. of melamine are added, one continues to heat and one removes 120 ml. of aqueous phase in 5 hours through cyclic distillation. Thus, the condensation is completed. The finishing process of the reaction product will follow now. Through addition of 2 ml. of 5 n-solution of caustic soda, one standardizes to a pH of 7.65. Under normal pressure, or if the distillation temperature should rise above 105° C. under a slight vacuum, 520 g. of distillate is drawn off at 100 to 105° C. through simple distillation. One distills within this temperature range, if need be in a vacuum, an additional 132 g. of distillate, while simultaneously 132 g. of isobutanol, free of water, flow into the deposit, in accordance with the distillation, from a dropping funnel. Following this, one thins down and filters with 220 g. of isobutanol and 30 g. of xylene to a solid body content of 51.5% by weight.

The resin solution no longer contains any free formaldehyde. The viscosity of the resin solution amounts to 144 DIN-sec. (20° C.), the gasoline compatability is 1:3.6.

MELAMINE RESIN B 800 g. of isobutanol, 164 g. of paraform (97% by weight) and 1 ml. of glacial acetic acid are heated together, while being stirred, to 70° C. Then one adds 160 g. of melamine, one continues to heat and removes 58 ml. of aqueous phase through cyclic distillation in 5 hours. With that, the condensation is completed. Now there follows the finishing process of the reaction product. Through addition of 4 ml. of 5 n-solution of caustic soda, one standardizes to a pH of 8.1. Under normal pressure, or if the distillation temperature should rise above 105° C. under a slight vacuum, 512 g. of distillate are drawn off to a descending cooler at 100 to 105° C. An additional 125 g. of distillate are distilled off, if need be, under a vacuum, within this temperature range, while simultaneously 125 g. of isobutanol, free of water, will flow to the deposit through a dropping funnel in accordance with the distillation. Subsequently, one standardizes and filters with 235 g. of isobutanol and 35 g. of xylene to a solid body content of 61.5% by weight. The resin solution no longer contains any free formaldehyde. The viscosity of the resin solution amounts to 64 DIN-sec. (20° C.), the compatability with gasoline is 1:4.3.

For combination with the new aminotriazine resins, all oil modified alkyd resins which are suitable for baked combination varnishes can be used, above all, those which do not have a yellowing effect at the baking temperatures in question, for example, such alkyd resins as contain soybean oil, coconut fat, castor oil, ricinus fat acid or synthetic, saturated fatty acids may be used.

One understands that as oil modified alkyd resins, stable in accordance with the invention, polymixed esters, which are obtained through condensation of di- or polycarboxylic acids and/or their anhydrides, saturated and/or unsaturated fatty acids with polyalcohols reacted in a molar excess are included. Di- or polycarboxylic acids that are to be taken into consideration in the first place are o-phthalic acid anhydride or o-phthalic acid; however other polycarboxylic acids or their corresponding anhydrides are also usable, such as, for example, isophthalic acid, tetra- and hexahydrophthalic acid, tetrachlorophthalic acid, hexachloroendomethylenetetrahydrophthalic acid, endomethylene tetrahydrophthalic acid, trimellitic acid as well as adipic and sebacic acid. In addition to or as partial substitutes for these saturated polycarboxylic acids, one can use in small quantities, $\alpha,\beta$-unsaturated dicarboxylic acids or their anhydrides, such a maleic acid, maleic acid anhydride, fumaric acid, itaconic acid, citraconic as well as aconitic acids.

By saturated and unsaturated fatty acids are included all straight chain and branched compounds or mixture obtained synthetically or occurring in natural products, which have a number of carbon atoms between 6 and 22.

As illustrative examples of suitable fatty acids, the following may be mentioned: caproic acid, caprylic acid, capric acid, lauric acid, myristic acid, palmitic acid, margaric acid, stearic acid, arachic acid, behenic acid, lignoceric acid, palmitoleic acid, petroselic acid, oleic acid, elaidic acid, erucic acid, 9,12-linoleic acid, linolenic acid, arachidonic acid, "clupanodonic" acid, sorbic acid, 9,11-linoleic acid (ricinic acid), $\alpha$-"eleostearic" acid. $\alpha$-"licanic" acid, $\alpha$-"parinaric" acid, ricinoleic acid, 9,10-dioxystearic acid and "isonalic" acid; furthermore isomeric mixtures of various isooctane and isononane acids, such as, 3,3,5-trimethylhexane acid, 3,4-dimethyl-1-hexanoic acid, 3,5-dimethyl-1-hexanoic acid, which are obtained through oxosynthesis from branched olefins as well as mixtures of branched fatty acids obtained according to the same process, which are carried under the trade name of "Versatic acid" and whose characteristic is a strong branching along the $\alpha$-carbon atom adjoining the carboxylic group.

As polyalcohols bi-, tri-, tetra- or compounds with a still higher valence are suitable. Preferably the tri- or tetravalent alcohols are used. However, one can also use mixtures of bi- or tetravalent polyalcohols. Illustrative examples of suitable polyalcohols are the following: ethylene glycol, propanediol-1,2, butanediol-1,3, butanediol-1,4, diethylene glycol, dipropylene glycol and their higher homologues, neopentyl glycol, 3,2,4-trimethylpentanediol-1,3, pentanediol-1,5, hydroxyalkylated bisphenols, hydrogenated bisphenol, dimethylolcyclohexane, glycerine, trimethylolethane, trimethylolpropane, 3,2-dimethylolbutanol-3, hexanetriol-1,2,6-pentaerythritol and its homologues formed through etherification, such as di- and triphentaerythritol, tetramethylolcyclohexanol, mannitol, sorbitol and $\alpha$-methylglucoside.

In the production of the oil modified alkyd resins, one can replace the saturated and/or unsaturated fatty acids through other monocarboxylic acids and thus still further vary the characteristics of the end products. As monocarboxylic acids, the following are suitable by way of example: hydrogenated and partly hydrogenated resinic acids, such as dihydro- and tetrahydroabietic acid, furthermore, benzoic acid and p-tert.-butylbenzoic acid.

The use of alkyd resin types which are low in oil, with which one can achieve hard and elastic films at low temperatures, is particularly advantageous. By alkyd resin types low in oil, let us understand particularly such which have less than 45% by weight of an oil portion.

In order to obtain the baking varnishes according to the invention, one uses 10 to 90% by weight of the aminotriazine resins according to the invention and 90% to 10% by weight of the above mentioned alkyd resins. The combination of 50 to 20% of the new aminotriazine resins and 50 to 80% of the alkyd resins is particularly favorable. The baking varnishes may also be used in their pigmented state.

The determination of the free formaldehyde in the aminotriazine resin solutions was accomplished in accordance with the hydroxylamine hydrochloride method: 5 g. of the resin solutions are dissolved in 25 ml. of isopropyl alcohol and are standardized with n/10 NaOH or —HCl to the transition point of bromine phenol blue. Thereupon, 50 ml. of 0.5 n-hydroxylamine hydrochloride solution (hydroxylamine hydrochloride dissolved in 1 part H₂O and 3 parts isopropyl alcohol) are added. After 30 minutes of reaction time, the hydrochloric acid that had become free will be titrated back with 0.5 n NaOH.

The use of the etherified aminotriazine resins containing no free formaldehyde is accompanied, beside the advantage of being odorless, as a technical step forward, by a considerable greater hardness, which shows itself particularly clearly in combination with alkyd resins low in oil, for which purpose these resins are particularly intended.

The ricinic alkyd mentioned in examples and in comparative experiments is produced in the following manner.

Ricinic alkyd resin: Kg.
   Castor oil _____ 250.00
   Calcium acetate _____ 0.05
   Trimethylolpropane _____ 125.00 are reetherified at 250° C. in a manner known in itself, until the product is soluble at 1:∞, cold in ethyl alcohol.

This monoester obtained in such a way is heated with

Kg.
Trimethylolpropane _____ 103.00
Phthalic acid anhydride _____ 292.00
Benzoic acid _____ 15.50
Triphenyl phosphite _____ 0.60 to 180° C. while stirring in the inert gas stream, until a sample remains cold clear.

Then 44 kg. of xylene is added and one heats under cyclic dehydration up to 210° C. until the acid numbers are 26 to 27 and the viscosity is 50% in xylene 70 to 80 DIN-sec.

This is then standardized to 60% of resin content with xylene.

The following examples are to explain the use of melamine resins:

Example 1

From 80 parts of TiO₂ RN–56 of the Titangesellschaft m.b.H., 178 parts of ricinic alkyd resin, 60% dissolved in xylene, depending on 106 parts of the melamine resin solution A and 20 parts of isopropyl glycol, varnishes are ground. The varnishes are spread on glass plates and are baked for 30 minutes at 90° C. and at 120° C. After 24 hours, the thickness of the layer and the "Pendel" hardness is determined. The thickness of the layer of the baked films is supposed to be between 25 and 35μ. For the sake of comparison, the same varnish is produced with a commercial formaldehyde containing melamine resin solution, the Super-Beckamine ® 852 (Reichhold Chemi AG., Hamburg), content in free formaldehyde: 3.5% by weight.

Example 2

One works analogously as in Example 1. However, one uses melamine resin B.

TABLE

| Baking Time | Temperature, °C. | Super-Beckamine 852 "Pendel" hardness, 3.5% by weight Formaldehyde | Melamine Resin, Example 1, 0% by weight Formaldehyde | Melamine Resin, Example 2, 0% by weight Formaldehyde |
|---|---|---|---|---|
| 30 minutes | 90 | 39 | 52 | 54–55 |
| Do | 120 | 128 | 145 | 143 |

Apart from the advantages which will accompany the elimination of formaldehyde in the processing of these aminotriazine resin solutions, it turned out during the technological examination, that baking varnishes on the basis of these resin solutions showed a considerably greater hardness as compared to the former formaldehyde containing resins known so far, and the technical progress of this process as compared to the above mentioned multistep process is to be found especially in this fact. This influence of the free formaldehyde on the hardness of the baked on films, as shown by the results of measurements summarized in the table, had not been known hitherto and neither was it to be expected.

I claim:

1. A process of making a varnish which comprises blending an alkyd resin with a heat hardenable, butanol-etherified formaldehyde aminotriazine condensation product, containing no free formaldehyde, formed by condensing through heating under dehydration under cyclic distillation until no more reaction water was formed, in the presence of weak acid through reaction of butanol and an aminotriazine of the general formula

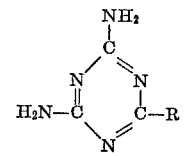

wherein R is a member of a group consisting of NH₂, a substituted NH₂, alkyl, aryl, acyl and hydroxy groups, and mixtures thereof with less than 5 moles formaldehyde and substances producing formaledhyde, in relation to a triaminotriazine.

2. A process of making a baking varnish according to claim 1 wherein 6 to 10 moles of isobutanol were used per mole of aminotriazine.

3. A process of making a baking varnish according to claim 1 wherein 8 to 9 moles of isobutanol were used per mole of aminotriazine.

4. A process according to claim 1 wherein the aminotriazine used is melamine.

5. A process according to claim 1 wherein 3.5 to 5 moles of paraform (about 95%) are used per mole of triaminotriazine.

6. A process according to claim 1 wherein 3.9 to 4.5 mole of paraform (about 95%) are used per mole of triaminotriazine.

7. A process according to claim 1 wherein glacial acetic acid is used as the weak acid, in quantities of 0.5 to 5 ml. per mole of aminotriazine.

8. A process according to claim 1 wherein glacial acetic acid is used as the weak acid, in quantities of 0.8 to 1.5 ml. per mole of aminotriazine.

9. A process according to claim 1 wherein after condensation is completed the reaction solution is concentrated at 100 to 110° C. up to a solid resin content of 65 to 75% by weight, and in this area of concentration an additional 150 to 250 g., preferably 200 g., of isobutanol are distilled away, while simultaneously and in accordance with the distillation, the equivalent amount of isobutanol free of water is introduced.

10. A process according to claim 1 wherein a substituted aminotriazine is used, in which R is selected from a group consisting of methyl, ethyl, propyl, i-propyl, butyl, i-butyl and amyl radicals.

11. A process according to claim 1 wherein a substituted aminotriazine is used, in which R is a phenyl group.

12. A process according to claim 1 wherein an aminotriazine is utilized, in which R is an acetyl group.

13. A process according to claim 1 wherein a monosubstituted aminotriazine is used in which R is a substituted NH₂ group which contains at least one member of a group consisting of methyl, ethyl, propyl, i-propyl, butyl, i-butyl, amyl, phenyl and acetyl radicals.

14. A baking varnish comprising a blend consisting essentially of (1) an alkyd resin and (2) an etherified aminotriazine resin substantially devoid of free formaldehyde, said varnish when baked having a substantially greater hardness than a comparable blend in which resin (2) has the normal quantity of free formaldehyde produced in accordance with the process of claim 1.

15. A baking varnish according to claim 14, containing about 10 to 90% by wegiht of aninotriazine resin and 90 to 10% by weight of alkyd resin.

16. A baking varnish according to claim 14, containing about 50 to 20% by weight of aminotriazine resin and 50 to 80% by weight of alkyd resin.

17. A baking varnish according to claim 14, containing a ricinic alkyd low in oil.

18. A process of making a varnish which comprises blending an alkyd resin with a heat hardenable, butanol-etherfied formaldehyde aminotriazine condensation product, containing no free formaldehyde, formed by condensing through heating under dehydration under cyclic distillation until no more reaction water was formed, in the presence of weak acid through reaction of butanol and an aminotriazine of the general formula

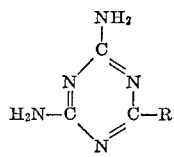

wherein R is a member of a group consisting of $NH_2$, a substituted $NH_2$, alkyl, aryl, acyl and hydroxy groups, and mixtures thereof with 3.9 to 4.5 moles formaldehyde and substances producing formaledhyde, in relation to a triaminotriazine.

References Cited

UNITED STATES PATENTS

| | | | |
|---|---|---|---|
| 2,951,048 | 8/1960 | Gusman et al. | 260—67.6 |
| 2,981,703 | 4/1961 | Hoenel | 260—21 |
| 2,996,463 | 8/1961 | Culbertson et al. | 260—21 |
| 3,317,630 | 5/1967 | Yuille | 260—67.6 |
| 3,321,418 | 5/1967 | Ritson | 260—67.6 |
| 3,211,805 | 10/1965 | Herbes et al. | 260—67.6 |
| 3,251,800 | 5/1966 | Cooley et al. | 260—67.6 |

DONALD E. CZAJA, *Primary Examiner.*

R. W. GRIFFIN, *Assistant Examiner.*

U.S. Cl. X.R.

117—124, 161, 167; 260—22, 33.4, 33.6, 39, 40, 67.6, 850